United States Patent
Jiang et al.

(10) Patent No.: US 9,020,029 B2
(45) Date of Patent: Apr. 28, 2015

(54) ARBITRARY PRECISION MULTIPLE DESCRIPTION CODING

(75) Inventors: Hong Jiang, Warren, NJ (US); Paul A. Wilford, Bernardsville, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 437 days.

(21) Appl. No.: 13/010,420

(22) Filed: Jan. 20, 2011

(65) Prior Publication Data

US 2012/0189047 A1     Jul. 26, 2012

(51) Int. Cl.
| | |
|---|---|
| H04N 7/26 | (2006.01) |
| H04L 1/00 | (2006.01) |
| H04L 27/26 | (2006.01) |

(52) U.S. Cl.
CPC .......... *H04L 1/0042* (2013.01); *H04L 1/0014* (2013.01); *H04L 27/2601* (2013.01)

(58) Field of Classification Search
CPC .................. H04N 7/5013; H04N 7/26106
See application file for complete search history.

(56) References Cited

U.S. PATENT DOCUMENTS

| | | | |
|---|---|---|---|
| 6,345,125 B2 | 2/2002 | Goyal et al. | |
| 6,594,627 B1 | 7/2003 | Goyal et al. | |
| 6,983,243 B1 | 1/2006 | Goyal et al. | |
| 7,961,790 B2 * | 6/2011 | Vitali et al. | 375/240.24 |
| 2007/0100476 A1 * | 5/2007 | Fan et al. | 700/31 |
| 2009/0279632 A1 * | 11/2009 | Lee et al. | 375/267 |
| 2010/0215092 A1 * | 8/2010 | Kuropatwinski et al. | 375/240 |

FOREIGN PATENT DOCUMENTS

| | | |
|---|---|---|
| JP | 2005192253 | 7/2005 |
| JP | 2006235643 | 9/2006 |
| WO | PCT/US2012/021017 | 6/2012 |

OTHER PUBLICATIONS

Chung et al. "Multiple Description Image Coding Using Signal Decomposition and Reconstruction Based on Lapped Orthogonal Transforms" IEEE Trans. on circuits and system for video technology, vol. 9, No. 6. Sep. 1999.*

Y.S. Chan et al., "Multimedia Communication Over OFDM Mobile Wireless Networks: A Cross-Layer Diversity Approach," IEEE International Conference on Communications (ICC), May 2005, pp. 1276-1281, vol. 2, Seoul, Korea.

(Continued)

*Primary Examiner* — Sath V Perungavoor
*Assistant Examiner* — Kate Luo
(74) *Attorney, Agent, or Firm* — Ryan, Mason & Lewis, LLP

(57) ABSTRACT

In one aspect, an encoder comprises arbitrary precision multiple description generation circuitry configured to produce multiple descriptions of a given signal by processing the signal using at least one matrix having a dimension which is selected as a function of a designated number of transmission resources, such as OFDM subcarriers or TDM time slots, that are allocated for transmission of the multiple descriptions. For example, the signal may comprise a vector x of dimension N and the arbitrary precision multiple description generation circuitry may be configured to generate M descriptions of the vector x where the value of M is selected to satisfy a particular one of three possible cases M=N, M>N and M<N depending on the number of subcarriers or time slots allocated for transmission of the multiple descriptions. Other aspects include a decoder, encoding and decoding methods, and associated computer program products.

28 Claims, 6 Drawing Sheets

(56) References Cited

OTHER PUBLICATIONS

L. Toni et al., "Channel Coding for Progressive Images in a 2-D Time-Frequency OFDM Block with Channel Estimation Errors," IEEE Transactions on Image Processing, Nov. 2009, pp. 2476-2490, vol. 18, No. 11.

V.K. Goyal et al., "Multiple Description Transform Coding: Robustness to Erasures Using Tight Frame Expansions," IEEE International Symposium on Information Theory, Aug. 1998, p. 408.

Vivek K. Goyal, "Multiple Description Coding: Compression Meets the Network," IEEE Signal Processing Magazine, Sep. 2001, pp. 74-93, vol. 18, No. 5.

R. Bernardini et al., "Frame-Based Multiple-Description Video Coding with Extended Orthogonal Filter Banks," EURASIP Journal on Applied Signal Processing, Aug. 2005, pp. 1-17, vol. 2006, Article ID 53623.

G.Z. Karabulut et al., "Multiple Description Coding Using Orthogonal Matching Pursuit," Proceedings of the 3rd Annual Mediterranean Ad Hoc Networking Workshop (Med-Hoc-Net '04), Jun. 2004, pp. 529-534, Bodrum, Turkey.

U.S. Appl. No. 12/652,390, filed in the name of H. Jiang et al. Jan. 5, 2010 and entitled "Orthogonal Multiple Description Coding."

* cited by examiner

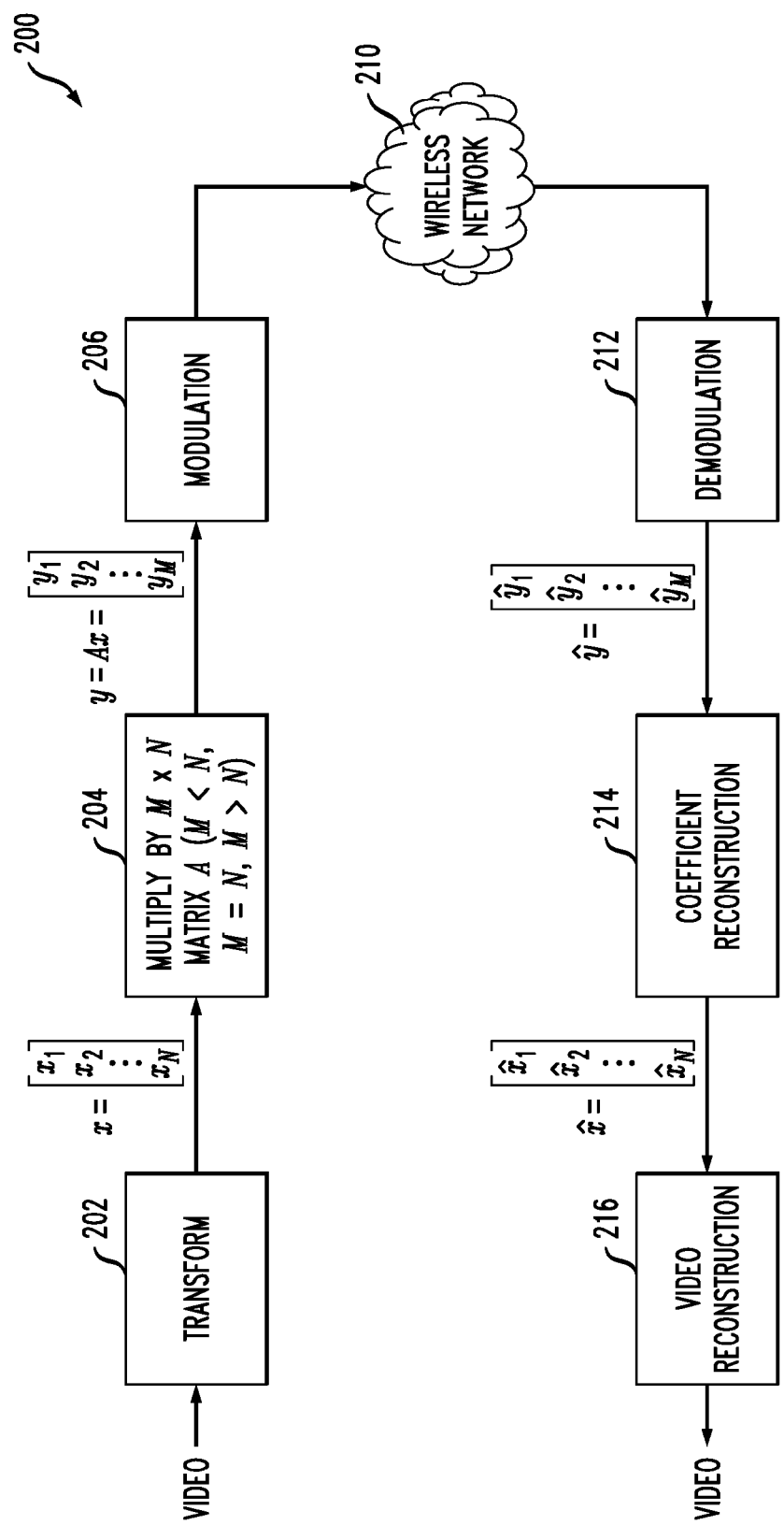

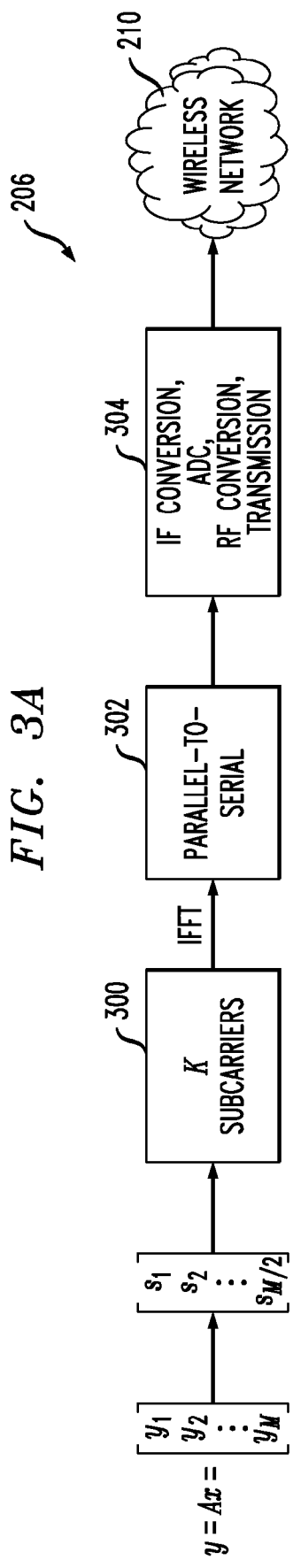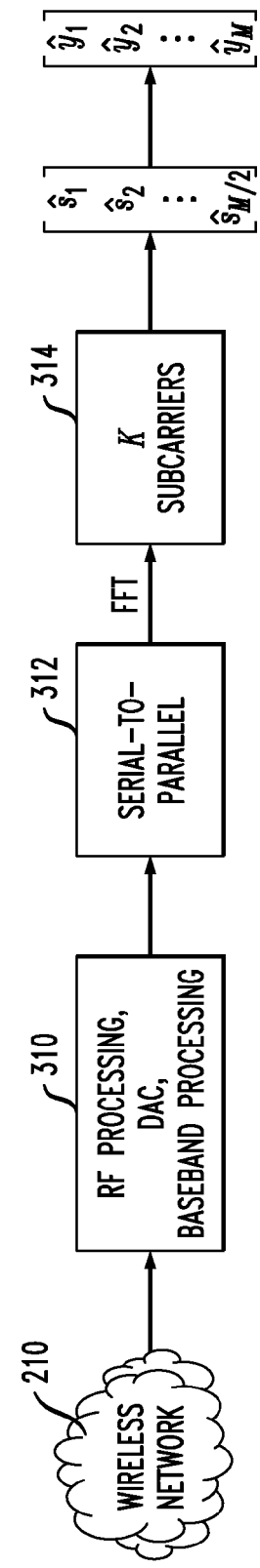

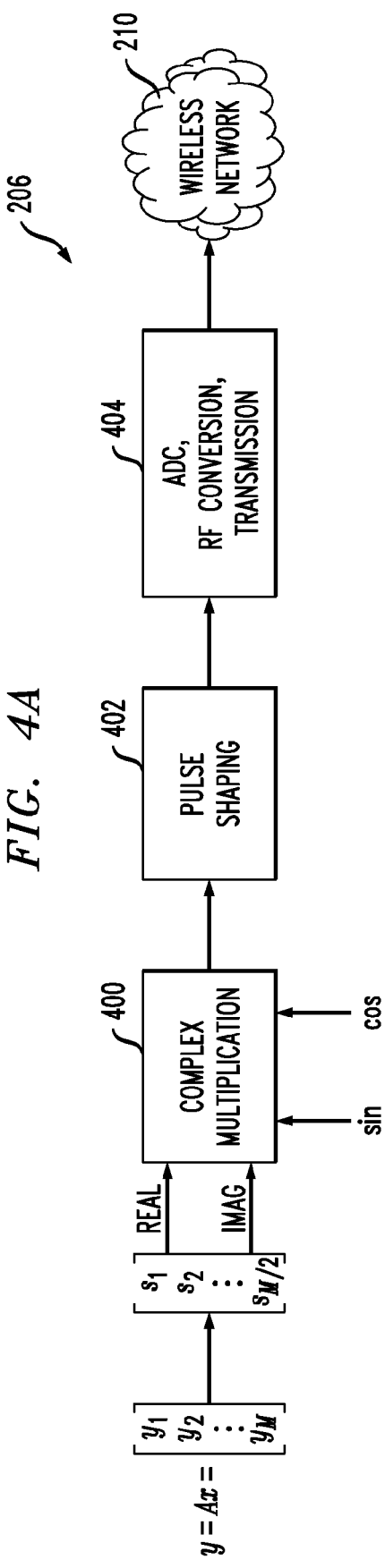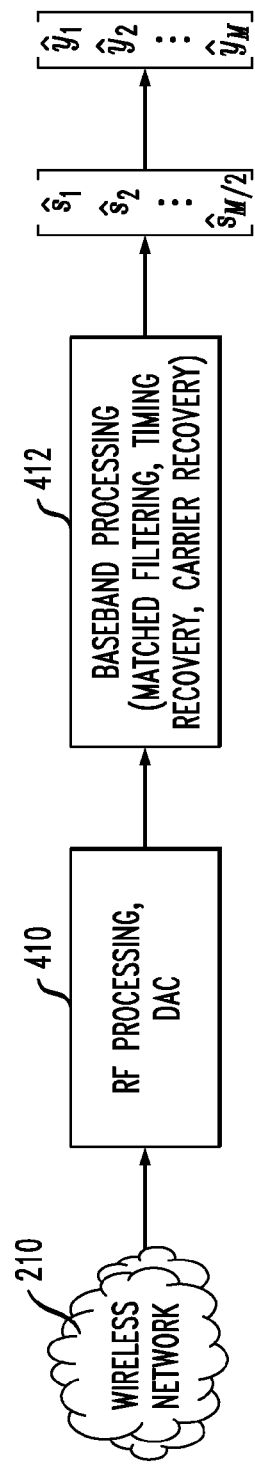
FIG. 4A
FIG. 4B

ARBITRARY PRECISION MULTIPLE DESCRIPTION CODING

FIELD OF THE INVENTION

The present invention relates generally to the field of signal processing, and more particularly relates to multiple description coding of signals for transmission over a communication network or other type of communication medium.

BACKGROUND OF THE INVENTION

In a typical multiple description coding arrangement, a given signal to be transmitted is processed in a transmitter to generate multiple descriptions of that signal, and the multiple descriptions are then transmitted over a network or other communication medium to a receiver. Each of the multiple descriptions may be viewed as corresponding to a different transmission channel subject to a different loss probability. The goal of multiple description coding is generally to provide a signal reconstruction quality at the receiver that improves as the number of received descriptions increases, without introducing excessive redundancy between the various multiple descriptions.

One known multiple description coding technique is commonly referred to as quantized frame expansion. The signal to be transmitted may be represented as an N-dimensional symbol vector $x = \{x_1, x_2, \ldots, x_N\}$. The symbol vector x is multiplied by a frame expansion transform T to generate an M-dimensional symbol vector $y = Tx = \{y_1, y_2, \ldots, y_M\}$, where the transform T is an M×N matrix and M>N. The symbol vector y is then subject to a quantization operation to form Y=Q(y). Forward error correction (FEC) and cyclic redundancy check (CRC) codes are then applied to Y before it is transmitted over a network to the receiver. At the receiver, the received signal $\hat{Y}$ is subject to FEC decoding and the CRC is used to detect symbol errors. The symbols with no errors are used to reconstruct an estimate of x. For additional details regarding this and other conventional multiple description coding techniques, see Vivek K Goyal, "Multiple Description Coding Compression Meets the Network," IEEE Signal Processing Magazine, September 2001, pp. 74-93.

Conventional multiple description coding techniques generally assume that the channels are so-called "erasure" channels. With such channels, a given symbol or other piece of data is known to the receiver to be either correct or in error, and some mechanism is needed to provide this capability, such as the above-noted FEC or CRC codes. However, the FEC or CRC codes are useful only for error detection and correction, and cannot otherwise be used to enhance the quality of a reconstructed signal when no errors occur. Use of such codes therefore represents a waste of bandwidth in any channels that do not have errors.

U.S. patent application Ser. No. 12/652,390, filed Jan. 5, 2010 and entitled "Orthogonal Multiple Description Coding," discloses improved multiple description coding techniques that overcome the above-described drawbacks of conventional multiple description coding. In one such technique, multiple descriptions of a given signal are generated by processing the signal using respective ones of a plurality of orthogonal matrices. Each of the multiple descriptions is generated as a function of the signal and a corresponding one of the plurality of orthogonal matrices. For example, M descriptions $y^{(i)}$ of an N-dimensional symbol vector x may be generated by applying respective ones of the orthogonal matrices to the vector x in accordance with the following equation:

$$y^{(i)} = U^{(i)} x, \, i=1, \ldots, M.$$

where $U^{(i)}$, $i=1, 2, \ldots, M$ denote orthogonal matrices of dimension N×N. The orthogonal matrices introduce redundancy in such a way that the redundancy can be used not only to improve signal reconstruction quality, but also to detect and correct errors in the received signal. The multiple descriptions therefore have error detection and correction capability built into them. This avoids the need to dedicate additional bandwidth for FEC and CRC, thereby ensuring that there will be no wasted bandwidth in the absence of errors, while also providing graceful degradation in the presence of errors.

Despite the considerable advantages provided by the above-described orthogonal multiple description coding technique, a need remains for further improvements, particularly with regard to providing optimal coding in the presence of variable channel conditions. For example, in coding techniques in which multiple description coefficients are subject to quantization prior to transmission, the bit rate and signal quality is fixed by the quantization level regardless of the actual channel condition. As a result, the bit rate and signal quality may be too low for a good channel, and may be too high for a poor channel. Therefore, such transmissions can lead to either a waste of bandwidth for good channels, or a failure to receive the signal in poor channels. Furthermore, in some systems, the number of transmission subcarriers is required to match the number of coefficients to be transmitted, which unduly limits the applications in which such systems can be used.

SUMMARY OF THE INVENTION

Illustrative embodiments of the present invention provide further improvements in multiple description coding of video and other signals by providing a technique referred to herein as arbitrary precision multiple description coding. In one or more of these illustrative embodiments, the arbitrary precision multiple description coding ensures that bandwidth utilization is optimal across a variety of channel conditions. Thus, in a good channel with higher available bandwidth, bit rate and signal quality are automatically increased. Similarly, in a poor channel with lower available bandwidth, bit rate and signal quality are automatically decreased. The multiple description coding therefore remains optimally matched to the current channel conditions.

In accordance with one aspect of the invention, an encoder comprises arbitrary precision multiple description generation circuitry configured to produce multiple descriptions of a given signal by processing the signal using at least one matrix having a dimension which is selected as a function of a designated number of transmission resources, such as orthogonal frequency division multiplexed (OFDM) subcarriers or time division multiplexed (TDM) time slots, that are allocated for transmission of the multiple descriptions. For example, the signal may comprise a vector x of dimension N and the arbitrary precision multiple description generation circuitry may be configured to generate M descriptions of the vector x where the value of M is selected to satisfy a particular one of three possible cases M=N, M>N and M<N depending on the number of subcarriers or time slots allocated for transmission of the multiple descriptions. Each of these three possible cases M=N, M>N and M<N is intended to be viewed as a type of multiple description transmission as that term is used herein.

In one of the illustrative embodiments, the vector x of dimension N is multiplied by an M×N matrix A to yield an M-dimensional vector y, where each of the M entries of the vector y comprises a different description of the vector x. The matrix A used to generate the M-dimensional vector y from the vector x may be formed as a product of an M×N matrix B and an N×N diagonal matrix D.

The M-dimensional vector y is mapped to a complex vector s of dimension M/2 that is to be modulated using OFDM or TDM techniques. The entries of the complex vector s may comprise, by way of example, complex numbers each formed using a pair of real numbers from y, as follows:

$$s_1=y_1+jy_2, s_2=y_3+jy_4, \ldots, s_{M/2}=y_{M-1}+jy_M,$$

where $j=\sqrt{-1}$.

In an exemplary OFDM implementation, the entries of the complex vector s may be assigned to respective ones of a plurality of subcarriers allocated for transmission of the multiple descriptions.

Similarly, in an exemplary TDM implementation, the entries of the complex vector s may be assigned to respective ones of a plurality of time slots allocated for transmission of the multiple descriptions.

It is important to note that in these OFDM and TDM implementations, the modulation process does not involve any quantization of the entries of the complex vector s. Instead, the entries of the complex vector s may be modulated, for example, in floating point format or as very high precision integers. Also, there is no need for any additional channel coding such as FEC or CRC to be applied prior to transmission.

The illustrative embodiments provide significant advantages over conventional approaches. For example, in one or more of these embodiments, as noted above, quantization is not performed on the multiple description coefficients. The precision of the received coefficients is instead determined by channel noise, and is therefore optimal across all channel conditions. Signal quality scales automatically with the channel conditions. Also, no error detection or correction is needed, and yet graceful degradation in the presence of errors is achieved. Moreover, the number of transmission subcarriers is not required to match the number of coefficients to be transmitted, and thus system implementation flexibility is considerably improved. The disclosed techniques are particularly advantageous in video transmission over wireless channels.

These and other features and advantages of the present invention will become more apparent from the accompanying drawings and the following detailed description.

BRIEF DESCRIPTION OF THE DRAWINGS

FIG. 2 shows a more detailed view of a communication system that incorporates arbitrary precision multiple description coding in another embodiment of the invention.

FIGS. 3A and 3B illustrate respective modulation circuitry and demodulation circuitry of the FIG. 2 system in an exemplary OFDM implementation.

FIGS. 4A and 4B illustrate respective modulation circuitry and demodulation circuitry of the FIG. 2 system in an exemplary TDM implementation.

DETAILED DESCRIPTION OF THE INVENTION

The present invention will be illustrated herein in conjunction with exemplary communication systems, processing devices and arbitrary precision multiple description coding techniques. It should be understood, however, that the invention is not limited to use with the particular types of systems, devices and techniques disclosed. For example, aspects of the present invention can be implemented in a wide variety of other communication system configurations, using processing devices and process steps other than those described in conjunction with the illustrative embodiments.

Figure 1:
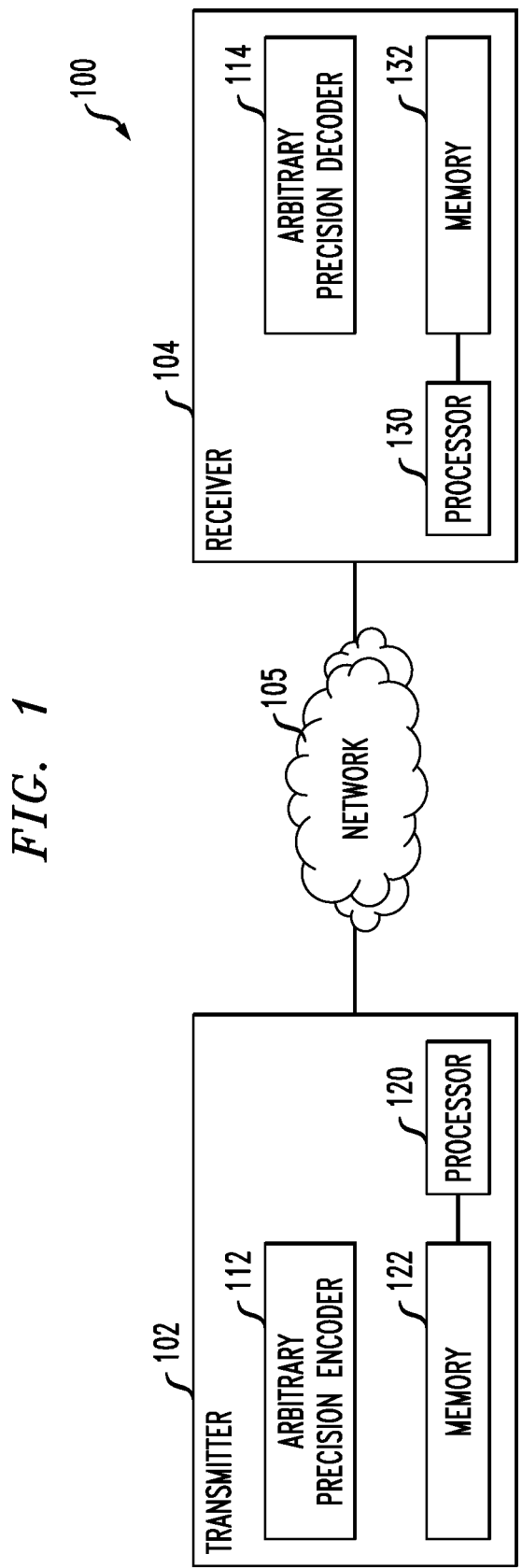
FIG. 1 is a block diagram of a communication system that incorporates arbitrary precision multiple description coding in an illustrative embodiment of the invention.

FIG. 1 shows a communication system 100 comprising a transmitter 102 coupled to a receiver 104 via a network 105. The transmitter includes an arbitrary precision multiple description encoder 112 and the receiver includes an arbitrary precision multiple description decoder 114. Also included in the transmitter 102 is a processor 120 coupled to a memory 122. Similarly, the receiver 104 comprises a processor 130 coupled to a memory 132.

The transmitter 102 may comprise at least a portion of a computer, a server or any other type of processing device suitable for supplying signals to receiver 104 over network 105. The signals supplied by the transmitter may comprise data, speech, images, video, audio or other types of signals in any combination. These signals are coded in arbitrary precision multiple description encoder 112 before being transmitted over the network.

The receiver 104 may comprise at least a portion of a communication device or any other type of processing device suitable for receiving signals from transmitter 102 over the network 105. For example, the receiver may be implemented in a portable or laptop computer, mobile telephone, personal digital assistant (PDA), wireless email device, television set-top box (STB), or other communication device. Signals received from the transmitter over the network 105 are decoded by the arbitrary precision multiple description decoder 114.

The network 105 may comprise a wide area network such as the Internet, a metropolitan area network, a local area network, a cable network, a telephone network, a satellite network, as well as portions or combinations of these or other networks. As a more particular example, the network 105 may comprise a multicast or broadcast network used to transmit video from a multimedia server to multiple client devices.

The memories 122 and 132 may be used to store software programs that are executed by their associated processors 120 and 130 to implement the functionality described herein. For example, software running on processor 120 of transmitter 102 may be used to implement at least a portion of the arbitrary precision multiple description encoder 112, while software running on processor 130 of receiver 104 may be used to implement at least a portion of the arbitrary precision multiple description decoder 114. A given one of the memories 122 and 132 may be an electronic memory such as random access memory (RAM), read-only memory (ROM) or combinations of these and other types of storage devices. Such a memory is an example of what is more generally referred to herein as a computer program product or still more generally as a computer-readable storage medium that has executable program code embodied therein. Other examples of computer-readable storage media may include disks or other types of magnetic or optical media, in any combination.

The transmitter 102 and receiver 104 may each include additional components configured in a conventional manner. For example, each of these elements will generally include network interface circuitry for interfacing with the network 105.

FIG. 2 shows a more detailed view of an embodiment of the invention, more particularly involving video transmission over a wireless network. In this embodiment, system 200 includes a transmitter comprising a transform module 202, a multiple description generator module 204 and a modulation module 206. The transmitter communicates over wireless network 210 with a receiver comprising a demodulation module 212, a coefficient reconstruction module 214, and a video reconstruction module 216. The modules 202, 204 and 206 may be viewed, for example, as collectively comprising an implementation of the arbitrary precision multiple description encoder 112 in transmitter 102 of FIG. 1. Similarly, the modules 212, 214 and 216 may be viewed, for example, as collectively comprising an implementation of the arbitrary precision multiple description decoder 114 in receiver 104 of FIG. 1.

The various modules shown in FIG. 2 may be viewed as examples of circuitry used to implement the associated functionality. Such circuitry may comprise well-known conventional encoding and decoding circuitry suitably modified to operate in the manner described herein. For example, portions of such circuitry may comprise processor and memory circuitry associated with the processors 120, 130 and memories 122, 132 of FIG. 1. Other examples include matrix multiplication circuitry or other types of arithmetic logic circuitry, digital signal processors, transceivers, etc. Conventional aspects of such circuitry are well known to those skilled in the art and therefore will not be described in detail herein.

In the FIG. 2 embodiment, x denotes an original message, at the output of the transform module 202, that is to be transmitted in the system 200, and more particularly comprises a vector of real numbers:

$$x = \begin{bmatrix} x_1 \\ x_2 \\ \vdots \\ x_N \end{bmatrix}.$$

For example, x may be a set of transformed coefficients generated in a video compression process implemented by transform module 202. The video compression process may involve use of discrete cosine transform (DCT), wavelet transform, compressive sampling, or other types of transforms in any combination. The transform may be performed on blocks of video of specified dimensions. The result of the transform as applied to a given such video block is the above-noted original message vector x of real numbers. Entries of the vector x are also referred to herein as original message coefficients.

Of course, as previously indicated, a wide variety of other types of information can be transmitted using the arbitrary precision multiple description coding techniques disclosed herein. It is assumed for purposes of illustration only that the original message x is generated in module 202 by transforming an input video signal.

In conventional systems, transform coefficients generated by a transform module such as transform module 202 would generally be quantized prior to transmission. Quantization is performed to limit the bit rate of the coded video. This is problematic in that the bit rate and signal quality are fixed at a predetermined level regardless of the condition of the channel, such that the bit rate and signal quality may be set too low for a good transmission channel, or too high for a poor transmission channel. The present embodiment does not perform any quantization on the transform coefficients. Instead, the precision of the coefficients is determined by the noise in the transmission. This is advantageous in that the precision and hence the quality of the video is determined based on the actual condition of the transmission channel. Channel usage is optimized in that a good channel results in higher precision, and a poor channel results in lower precision. No bits are wasted in error detection or correction regardless of the channel condition.

Still referring to FIG. 2, the original message x to be transmitted is applied to the multiple description generator module 204. From this original message, M messages are generated. These messages are referred to herein as arbitrary precision multiple description messages. Each of the M messages is a description of the original message x. Any multiple description message, or any subset of these messages, can be used to reconstruct an approximation to the original message. The more messages that are used in the reconstruction, the more accurately the reconstructed message approximates the original message.

In the present embodiment, the arbitrary precision multiple description messages are generated in module 204 in the following manner. The original message vector x of length N is multiplied by an M×N matrix A to yield an M-dimensional vector y:

$$y = Ax = \begin{bmatrix} y_1 \\ y_2 \\ \vdots \\ y_M \end{bmatrix}$$

Each of the M entries of the vector y may be viewed as a different description of the original message vector x. These entries are also referred to herein as multiple description coefficients. As will be described in greater detail below, the value M in the present embodiment is determined as a function of a designated number of transmission resources, such as OFDM subcarriers or TDM time slots, that are allocated for transmission of the multiple description coefficients in modulation module 206, and the value N in the present embodiment denotes the corresponding number of original message coefficients to be transmitted using these allocated subcarriers or time slots.

The value M is therefore a configuration parameter in the system 200, and is determined based on the number of subcarriers or timeslots available or otherwise allocated for transmission of the multiple descriptions. It is not dependent on channel conditions or feedback from the receiver, but is instead determined by the available transmission bandwidth as reflected in the number of subcarriers or time slots allocated for transmission. The designated number of subcarriers or time slots may be the maximum number currently available in the system, or some lesser number based on a desired configuration of the system. For example, assume the available transmission bandwidth is 5 MHz, comprising 8 k subcarriers. If this bandwidth is used to transmit one video channel, then all 8 k subcarriers are available to that video channel. However, if this bandwidth is used to transmit four video channels, then there are only 2 k subcarriers available to each video channel. Alternatively, it is possible to allocate more subcarriers to some of the channels than to others, depending on the video content. The value of M can therefore be changed dynamically, as the system configuration changes. The value of M is selected at the transmitter and communicated to the receiver.

A variety of different types of modulation may be used in implementing the illustrative embodiments of the present invention. These include, by way of example, OFDM modulation and TDM modulation, which will be described in greater detail below in conjunction with FIGS. 3 and 4, respectively. As indicated previously, after the above-described matrix multiplication, the resulting vector y is modulated without the use of any quantization or any additional channel coding such as FEC or CRC. This is an important advantage of the illustrative embodiments over conventional techniques that require quantization and channel coding of the multiple descriptions.

FIG. 3A shows the processing of the vector y in the modulation module 206 for transmission over the wireless network 210 in an OFDM implementation. The M-dimensional vector y is initially mapped to a complex vector s of dimension M/2 given by:

$$s = \begin{bmatrix} s_1 \\ s_2 \\ \vdots \\ s_{M/2} \end{bmatrix},$$

where the complex vector s is a vector of complex numbers. More specifically, the M real numbers of the vector y are mapped to M/2 complex number entries of the complex vector s by taking pairs of real numbers from y to form corresponding complex numbers in s. The entries of s are therefore given by:

$$s_1 = y_1 + j y_2, s_2 = y_3 + j y_4, \ldots, s_{M/2} = y_{M-1} + j y_M,$$

where $j = \sqrt{-1}$.

These entries of the complex vector s are assigned to respective ones of K OFDM subcarriers in OFDM subcarrier assignment module 300, where $K \geq M/2$. It should be noted that the system may include more than M/2 subcarriers although M/2 is assumed to be the number of subcarriers that are currently allocated for transmission of the N coefficients. As indicated previously, other types of modulation, including non-OFDM modulation, may be used in other embodiments. For example, an alternative embodiment utilizing TDM modulation will be described below in conjunction with FIG. 4.

Again, there is no quantization of the entries of the vector s during the modulation process. Instead, the entries of the vector s may be modulated, for example, in floating point format or as very high precision integers. Also, as previously indicated, no additional channel coding is applied.

With continued reference to FIG. 3A, after an inverse fast Fourier transform (IFFT) operation is performed on the M/2 subcarriers, the corresponding parallel outputs are then converted to serial form in parallel-to-serial converter 302. The resulting serial stream is further processed in transmission module 304 which performs operations such as, for example, intermediate frequency (IF) conversion, analog-to-digital conversion (ADC), and radio frequency (RF) conversion, and finally transmits the resulting OFDM signal over the wireless network 210. These operations performed in transmission module 304 are exemplary, and additional or alternative operations can be performed in other embodiments.

Referring again to FIG. 2, the modulated signal transmitted over wireless network 210 is received in the demodulation module 212, which generates an estimate $\hat{y}$ of the M-dimensional multiple description vector y:

$$\hat{y} = \begin{bmatrix} \hat{y}_1 \\ \hat{y}_2 \\ \vdots \\ \hat{y}_M \end{bmatrix}$$

This estimate $\hat{y}$ is applied to the coefficient reconstruction module 214 which generates an estimate $\hat{x}$ of the N-dimensional original message x:

$$\hat{x} = \begin{bmatrix} \hat{x}_1 \\ \hat{x}_2 \\ \vdots \\ \hat{x}_N \end{bmatrix}.$$

The original message estimate $\hat{x}$ is processed in the video reconstruction module to recover the original video signal.

FIG. 3B illustrates the operation of the demodulation module 212 in generating the estimate $\hat{y}$ from an OFDM signal received over the wireless network 210. The received OFDM signal is subject to operations such as RF processing, digital-to-analog conversion (DAC) and baseband processing in reception module 310, and the resulting serial output is converted to parallel form in serial-to-parallel converter 312. An FFT operation is performed to recover the subcarriers that are further processed in module 314 to generate an estimate $\hat{s}$ of the complex vector s as follows:

$$\hat{s} = \begin{bmatrix} \hat{s}_1 \\ \hat{s}_2 \\ \vdots \\ \hat{s}_{M/2} \end{bmatrix},$$

where each entry of $\hat{s}$ comprises the complex number associated with a corresponding one of the received subcarriers. The real and imaginary parts of each complex number in $\hat{s}$ are used to form two real number entries of the estimate $\hat{y}$. The estimate $\hat{y}$ is then utilized along with matrix A=BD to reconstruct the estimate $\hat{x}$.

FIG. 4A shows the processing of the vector y in the modulation module 206 for transmission over the wireless network 210 in a TDM implementation. The M-dimensional vector y is initially mapped to a complex vector s of dimension M/2, where the complex vector s is again a vector of complex numbers with each such complex number formed from a corresponding pair of real numbers from y. There is no conventional mapping of bits to modulation constellation points in this arrangement. Instead, the real and imaginary parts of the entries of the complex vector s are subject to complex multiplication with respective sin and cos signals in module 400, followed by pulse shaping in module 402. The resulting output is further processed in transmission module 404, which performs operations such as, for example, ADC and RF conversion, and finally transmits the resulting TDM signal over the wireless network 210. These operations performed in transmission module 404 are exemplary, and additional or alternative operations can be performed in other embodiments.

FIG. 4B illustrates the operation of the demodulation module 212 in generating the estimate $\hat{y}$ from a TDM signal received over the wireless network 210. The received TDM signal is subject to operations such as RF processing and DAC in reception module 410, and the resulting output is subject to further processing in baseband processing module 412. This baseband processing may involve operations such as matched filtering, timing recovery and carrier recovery. The baseband processing module 412 generates at its output the estimate $\hat{s}$ of the complex vector s, where each entry of $\hat{s}$ comprises the complex number associated with a corresponding one of the received time slots. As in the FIG. 3 embodiment, the real and imaginary parts of each complex number in $\hat{s}$ are used to form two real number entries of the estimate $\hat{y}$, and the estimate $\hat{y}$ is then utilized along with matrix A=BD to reconstruct the estimate $\hat{x}$.

In both the OFDM and TDM implementations of system 200 of FIG. 2 described above, three different cases of relative values of M and N are permitted in the transmitter, namely, M=N, M>N and M<N. Each of these three possible cases M=N, M>N and M<N is intended to be viewed as a type of multiple description transmission as that term is used herein.

For case M=N, the number of allocated subcarriers or time slots exactly matches the number of subcarriers or time slots needed to transmit the N original message coefficients as represented by the M/2 complex numbers of vector s.

For case M>N, there are more subcarriers or time slots allocated than are needed to transmit the N original message coefficients, and so the N original message coefficients are transmitted with a higher precision.

For case M<N, there are fewer subcarriers or time slots allocated than are needed to transmit the N original message coefficients, and so the N original message coefficients are transmitted with a lower precision.

Thus, in the embodiments of FIGS. 3 and 4, the value of M is varied as a function of the number of allocated subcarriers or timeslots. Accordingly, if the number of allocated subcarriers or time slots is large, a larger value of M is used in generating the multiple descriptions in the generator module 204. Similarly, if the number of allocated subcarriers or time slots is small, a smaller value of M is used in generating the multiple descriptions.

The matrix A used to generate the M-dimensional vector y from the original message vector x in multiple description generator module 204 is constructed as a product of an M×N matrix B and an N×N diagonal matrix D as follows:

$$A = BD.$$

The matrix B is predefined, and is known to both the transmitter and receiver. It varies depending on which of the above-noted three cases characterizes the current transmission environment. Several different versions of the matrix B can be predefined, with an index being supplied from the transmitter to the receiver to indicate which version of B is in use at a particular time. More detailed examples of the matrix B for each of the three cases identified above will be provided elsewhere herein.

The diagonal matrix D generally performs a scaling function for the original message vector x. This scaling allows certain coefficients in x to have more precision than other coefficients in x. For example, if the coefficients of x are generated using a DCT transform, lower spatial frequency coefficients may need more precision than higher spatial frequency coefficients. The relative values of the entries of D determine the relative precision to be used for the coefficients of x. For example, if coefficient $x_1$ needs one more bit of precision than coefficient $x_2$, the values of entries $d_1$ and $d_2$ may be set such that $d_1 = 2d_2$. The diagonal matrix D is known to the transmitter but not to the receiver. It is therefore transmitted in a reliable channel between the transmitter and the receiver. This may be a conventional transmission channel that utilizes at least one of FEC and CRC codes.

The matrix A formed as the product of the matrices B and D is configured to spread the channel error energy across all of the transmitted signal components, and allows any number of coefficients to be transmitted using any number of subcarriers or time slots.

The term "applying" as used herein in the context of applying a matrix is intended to be construed broadly so as to encompass multiplication by the matrix as in the present embodiment or other processing that utilizes the matrix.

More detailed examples of the matrix B will now be described for each of the three cases M=N, M>N and M<N. The matrix B is generally configured to spread out the channel error energy e into multiple components:

$$\hat{y} = \begin{bmatrix} \hat{y}_1 \\ \hat{y}_2 \\ \vdots \\ \hat{y}_M \end{bmatrix} = y + e = Bx + e, \hat{x} = B^{-1}\hat{y} = x + B^{-1}e.$$

Thus, B is preferably configured such that entries of $B^{-1}e$ will be of similar size even if entries of e have different sizes.

In the case M=N, where the number of allocated subcarriers or time slots exactly matches the number of subcarriers or time slots needed to transmit the N original message coefficients, the matrix B may be an orthogonal matrix of random entries. For example, B may be given by:

$$B = \prod_{n=1}^{N} \left( I - \frac{2}{(v^{(n)})^T v^{(n)}} v^{(n)}(v^{(n)})^T \right),$$

where $v^{(n)}$ are vectors of length N with random entries.

In the case M>N, where there are more subcarriers or time slots allocated than are needed to transmit the N original message coefficients, the coefficients can be transmitted with higher precision and the matrix B may be given by:

$$B = \begin{bmatrix} (u^{(1)})^T \\ \vdots \\ (u^{(M)})^T \end{bmatrix},$$

where $v^{(n)}$ are vectors of length M with random entries, and $u^{(n)}, n=1, \ldots, M$, are orthonormal vectors from $v^{(n)}$. As a more particular example for this case, if M=kN the matrix B may be given by:

$$B = \begin{bmatrix} U^{(1)} \\ \vdots \\ U^{(k)} \end{bmatrix},$$

where $U^{(i)}$ are orthogonal N×N matrices of random entries. This is a type of orthogonal multiple description code as described in the above-cited U.S. patent application Ser. No. 12/652,390.

In the case M<N, where there are fewer subcarriers or time slots allocated than are needed to transmit the N original message coefficients, the coefficients can be transmitted with lower precision and the matrix B may be given by:

$$B = \begin{bmatrix} (u^{(1)})^T \\ \vdots \\ (u^{(M)})^T \end{bmatrix}$$

where $v^{(n)}$ are vectors of length N with random entries, and $u^{(n)}$, n=1, ..., M, are orthonormal vectors from $v^{(n)}$.

The manner in which the estimate $\hat{x}$ of the original message vector x is reconstructed from $\hat{y}$ in coefficient reconstruction module 214 using the matrix A will now be described in greater detail. This coefficient reconstruction process generally involves finding a solution to the equation:

$$\hat{y} = A\hat{x},$$

which may be done by finding a least-squares solution in the appropriate one of the three cases M=N, M>N and M<N, in the following manner. More specifically, for the case M=N, the estimate $\hat{x}$ may be determined as follows:

$$\hat{x} = A^{-1}\hat{y}.$$

For the case M>N, the estimate $\hat{x}$ may be determined as follows:

$$\hat{x} = (A^T A)^{-1} A^T \hat{y}.$$

Finally, for the case M<N, the estimate $\hat{x}$ may be determined as follows:

$$\hat{x} = A^T (A A^T)^{-1} \hat{y}.$$

It is to be appreciated that other types of coefficient reconstruction techniques may be used in other embodiments.

The precision of the reconstructed coefficients can be determined in the following manner. Let $x_n$ be the nth coefficient of the original message vector x and let the corresponding reconstructed coefficient of the estimate $\hat{x}$ be:

$$\hat{x}_n = x_n + e_n$$

where $e_n$ is the error in the reconstructed coefficient. Define the precision of the original coefficient $x_n$ as:

$$P_{x_n} = \sqrt{\frac{E(x_n^2)}{E(e_n^2)}},$$

where E(•) denotes the expectation operator. The number of bits of the precision of $x_n$ can then be defined as:

$$\log_2 P_{x_n} = \frac{1}{2} \log_2 \frac{E(x_n^2)}{E(e_n^2)}.$$

Also define the signal-to-noise ratio as $E_c/N_0$ and the bandwidth as $Bw = M/N$ The theoretical bound for the precision of the reconstructed coefficients is then given by:

$$P_{x_n} = \sqrt{\frac{M}{N} \frac{E_c}{N_0}} = \sqrt{Bw \frac{E_c}{N_0}}$$

The precision of the received coefficients is therefore a monotonically increasing function of $E_c/N_0$. The corresponding video quality at the output of the video reconstruction module 216 is therefore also a function of $E_c/N_0$ as well as the relative values of M and N.

Figure 5:
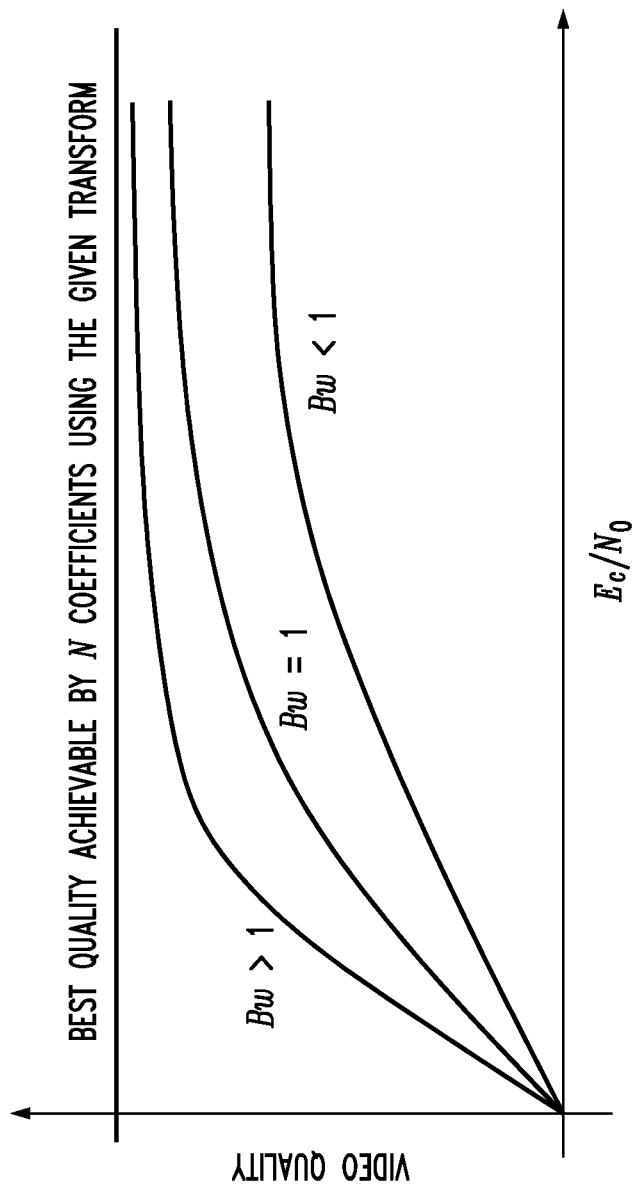
FIG. 5 is a plot of video quality as a function of signal-to-noise ratio showing performance achievable in an illustrative embodiment at different precision levels.

FIG. 5 provides a plot of video quality as a function of signal-to-noise ratio showing performance achievable in an illustrative embodiment at different precision levels, that is, at different relative values of M and N as reflected in the bandwidth values Bw=1, Bw>1 and Bw<1 which correspond to the respective cases M=N, M>N and M<N. The horizontal line in the plot denotes the best quality achievable by using N coefficients for the given transform.

A variety of alternative embodiments of the FIG. 2 system are possible. For example, other embodiments may transmit the multiple descriptions over respective parallel channels, rather than serializing the descriptions prior to transmission in parallel-to-serial converter 302 of in the FIG. 3 embodiment. Also, as indicated previously, modulation techniques other than OFDM and TDM may be used in other embodiments.

Figure 6:
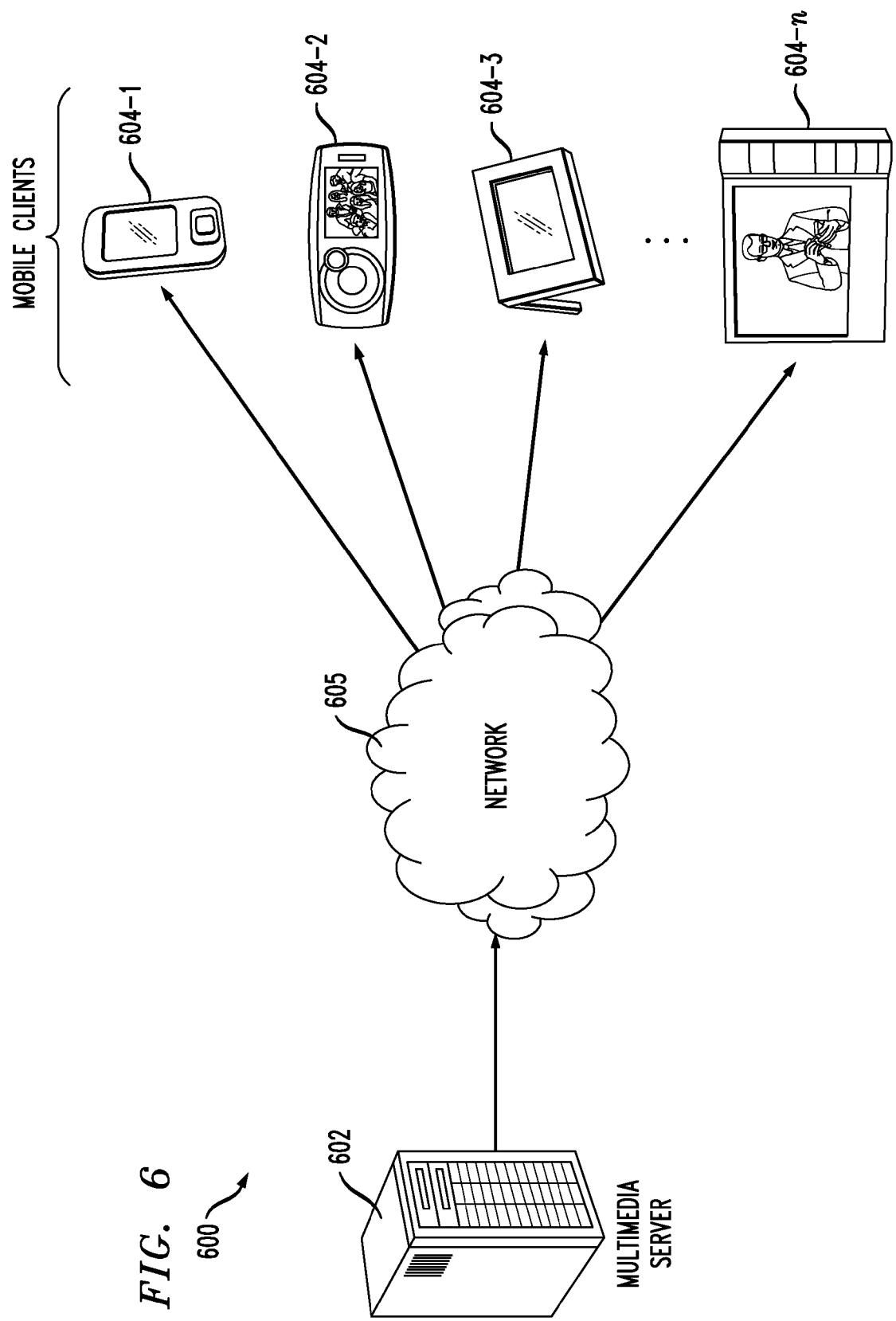
FIG. 6 is a block diagram of a communication system comprising a multimedia server implementing arbitrary precision multiple description coding in another embodiment of the invention.

FIG. 6 shows another example of a communication system 600 comprising a multimedia server 602 that implements arbitrary precision multiple description coding. The server 602 is assumed to include an arbitrary precision multiple description encoder comprising modules 202, 204 and 206 as previously described. The arbitrary precision multiple description encoder may be implemented by modifying an otherwise conventional video encoder to incorporate modules 202, 204 and 206. The multimedia server utilizes this encoder to generate multiple descriptions of a video signal in the manner previously described. Those descriptions are transmitted over a network 605 to mobile client devices which in this example include devices 604-1, 604-2, 604-3 and 604-4. Each such device is assumed to include an arbitrary precision multiple description decoder comprising modules 212, 214 and 216. These decoders may each be implemented by modifying an otherwise conventional video decoder to incorporate modules 212, 214 and 216. The network 605 may comprise a multicast or broadcast network used to transmit video from the multimedia server 602 to the multiple client devices 604. The system 600 can also or alternatively use arbitrary precision multiple description coding to transmit images, voice, audio, data or any other type of signals, in any combination.

As indicated previously, embodiments of the present invention may be implemented at least in part in the form of one or more software programs that are stored in a memory or other computer-readable medium of a transmitter or receiver of a communication system. System components such as the modules 202, 204, 206, 212, 214 and 216 may be implemented at least in part using software programs. Of course, numerous alternative arrangements of hardware, software or firmware in any combination may be utilized in implementing these and other system elements in accordance with the invention. For example, embodiments of the present invention may be implemented in one or more field-programmable gate arrays (FPGAs), application-specific integrated circuits (ASICs) or other types of integrated circuit devices, in any combination. Such integrated circuit devices, as well as portions or combinations thereof, are examples of "circuitry" as the latter term is used herein.

It should again be emphasized that the embodiments described above are presented for purposes of illustration only, and should not be interpreted as limiting in any way. Other embodiments may use different types of communication system components, device configurations, transmission resources, modulation formats and communication media, depending on the needs of the particular arbitrary precision multiple description coding application. Alternative embodiments may therefore utilize the techniques described herein in other contexts in which it is desirable to implement efficient coding of signals for transmission. Also, it should also be noted that the particular assumptions made in the context of describing the illustrative embodiments should not be construed as requirements of the invention. The invention can be implemented in other embodiments in which these particular assumptions do not apply. These and numerous other alternative embodiments within the scope of the appended claims will be readily apparent to those skilled in the art.

What is claimed is:

1. An apparatus comprising:
an encoder;
the encoder comprising arbitrary precision multiple description generation circuitry configured to produce multiple descriptions of a given signal by processing the signal using at least one matrix having a dimension which is selected based at least in part on a comparison of a dimensionality of the signal and a designated number of transmission resources allocated for transmission of the multiple descriptions such that the selected dimension of the matrix has a first value when the designated number of transmission resources exceeds the dimensionality of the signal and a second value different than the first value when the designated number of transmission resources is less than the dimensionality of the signal;
wherein the number of descriptions produced is based at least in part on the selected dimension; and
wherein the signal comprises at least one of video information, image information, audio information and voice information.

2. The apparatus of claim 1 wherein the designated number of transmission resources comprises one of a designated number of subcarriers and a designated number of time slots.

3. The apparatus of claim 2 wherein the arbitrary precision multiple description generation circuitry is configured to generate M descriptions of the signal wherein the value of M is selected as a function of the designated number of subcarriers or time slots allocated for transmission of the multiple descriptions.

4. The apparatus of claim 3 wherein the signal comprises a vector x of dimension N and the arbitrary precision multiple description generation circuitry is configured to generate M descriptions of the vector x and wherein the value of M is selected to satisfy a particular one of three possible cases M=N, M>N and M<N depending on the designated number of subcarriers or timeslots allocated for transmission of the multiple descriptions.

5. The apparatus of claim 4 wherein the vector x of dimension N is multiplied by an M×N matrix A to yield an M-dimensional vector y:

$$y = Ax = \begin{bmatrix} y_1 \\ y_2 \\ \vdots \\ y_M \end{bmatrix}$$

wherein each of the M entries of the vector y comprises a different description of the vector x.

6. The apparatus of claim 5 wherein the M-dimensional vector y is mapped to a complex vector s of dimension M/2 given by:

$$s = \begin{bmatrix} s_1 \\ s_2 \\ \vdots \\ s_{M/2} \end{bmatrix},$$

and entries of the complex vector s are modulated for transmission without use of quantization or additional channel coding.

7. The apparatus of claim 6 wherein the entries of the complex vector s comprise respective complex numbers each formed using a pair of real numbers from y such that said entries of s are given by:

$$s_1 = y_1 + jy_2, s_2 = y_3 + jy_4, \ldots, s_{M/2} = y_{M-1} + jy_M,$$

where $j = \sqrt{-1}$.

8. The apparatus of claim 7 wherein the entries of the complex vector s are assigned to respective ones of a plurality of orthogonal frequency division multiplexed (OFDM) subcarriers for transmission.

9. The apparatus of claim 7 wherein the entries of the complex vector s are assigned to respective ones of a plurality of time division multiplexed (TDM) time slots for transmission.

10. The apparatus of claim 5 wherein the matrix A used to generate the M-dimensional vector y from the vector x is formed as a product of an M×N matrix B and an N×N diagonal matrix D as follows:

$$A = BD.$$

11. The apparatus of claim 10 wherein a different version of the matrix B is utilized for each of the three cases M=N, M>N and M<N, and further wherein at least an identifier of the particular utilized version of the matrix B is supplied from a transmitter to a receiver in conjunction with transmission of the corresponding multiple descriptions of the signal from the transmitter to the receiver.

12. The apparatus of claim 10 wherein the diagonal matrix D performs a scaling function for the vector x that allows one or more designated coefficients in x to have a higher level of precision than other coefficients in x.

13. The apparatus of claim 12 wherein information characterizing the diagonal matrix D is supplied from a transmitter to a receiver in conjunction with transmission of the corresponding multiple descriptions of the signal from the transmitter to the receiver.

14. The apparatus of claim 10 wherein for the case M=N, the number of allocated subcarriers or time slots exactly matches the number of subcarriers or time slots needed to transmit the N entries of vector x using M multiple descriptions, and the matrix B is given by:

$$B = \prod_{n=1}^{N} \left( I - \frac{2}{(v^{(n)})^T v^{(n)}} v^{(n)} (v^{(n)})^T \right),$$

where $v^{(n)}$ are vectors of length N with random entries.

15. The apparatus of claim 10 wherein for the case M>N, there are more subcarriers or time slots allocated than are needed to transmit the N entries of vector x using M multiple descriptions, and the matrix B is given by:

$$B = \begin{bmatrix} (u^{(1)})^T \\ \vdots \\ (u^{(M)})^T \end{bmatrix},$$

where $v^{(n)}$ are vectors of length M with random entries, and $u^{(n)}$, n=1, ..., M, are orthonormal vectors from $v^{(n)}$.

16. The apparatus of claim 15 wherein M=kN and the matrix B is given by:

$$B = \begin{bmatrix} U^{(1)} \\ \vdots \\ U^{(k)} \end{bmatrix},$$

where $U^{(i)}$ are orthogonal N×N matrices of random entries.

17. The apparatus of claim 10 wherein for the case M<N, there are fewer subcarriers or time slots allocated than are needed to transmit the N entries of vector x using M multiple descriptions, and the matrix B is given by:

$$B = \begin{bmatrix} (u^{(1)})^T \\ \vdots \\ (u^{(M)})^T \end{bmatrix},$$

where $v^{(n)}$ are vectors of length N with random entries, and $u^{(n)}$, n=1, ..., M, are orthonormal vectors from $v^{(n)}$.

18. An integrated circuit comprising the apparatus of claim 1.

19. An encoding method comprising the steps of:
obtaining a given signal; and
producing multiple descriptions of the signal by processing the signal using at least one matrix having a dimension which is selected based at least in part on a comparison of a dimensionality of the signal and a designated number of transmission resources allocated for transmission of the multiple descriptions such that the selected dimension of the matrix has a first value when the designated number of transmission resources exceeds the dimensionality of the signal and a second value different than the first value when the designated number of transmission resources is less than the dimensionality of the signal;

wherein the number of descriptions produced is based at least in part on the selected dimension; and wherein the signal comprises at least one of video information, image information, audio information and voice information.

20. A non-transitory computer-readable storage medium having embodied therein executable program code that when executed by a processor of a processing device causes the device to perform the steps of the method of claim 19.

21. An apparatus comprising:
a decoder, the decoder comprising:
reconstruction circuitry configured to receive multiple descriptions of a given signal, and to generate an estimate of the signal by processing the received multiple descriptions using at least one matrix having a dimension which is selected based at least in part on a comparison of a dimensionality of the signal and a designated number of transmission resources that were utilized to transmit the multiple descriptions such that the selected dimension of the matrix has a first value when the designated number of transmission resources exceeds the dimensionality of the signal and a second value different than the first value when the designated number of transmission resources is less than the dimensionality of the signal;

wherein a number of descriptions received is based at least in part on the selected dimension; and wherein the signal comprises at least one of video information, image information, audio information and voice information.

22. An integrated circuit comprising the apparatus of claim 21.

23. The apparatus of claim 21 wherein the designated number of transmission resources comprises one of a designated number of subcarriers and a designated number of time slots, and wherein the reconstruction circuitry is configured to process M descriptions of the signal wherein the value of M is selected as a function of the designated number of subcarriers or time slots allocated for transmission of the multiple descriptions.

24. The apparatus of claim 23 wherein the signal comprises a vector x of dimension N and the reconstruction circuitry is configured to process M descriptions of the vector x and wherein the value of M is selected to satisfy a particular one of three possible cases M=N, M>N and M<N depending on the designated number of subcarriers or timeslots allocated for transmission of the multiple descriptions.

25. The apparatus of claim 24 wherein the reconstruction circuitry is configured to process the received multiple descriptions using a matrix A formed as a product of an M×N matrix B and an N×N diagonal matrix D as follows:

$$A=BD,$$

wherein a different version of the matrix B is utilized for each of the three cases M=N, M>N and M<N, and a particular utilized version of the matrix B is determined responsive to receipt of an identifier.

26. The apparatus of claim 25 wherein the reconstruction circuitry is configured to process the received multiple descriptions responsive to information characterizing the diagonal matrix D, wherein the diagonal matrix D performs a scaling function for the vector x that allows one or more designated coefficients in x to have a higher level of precision than other coefficients in x.

27. A decoding method comprising the steps of:
receiving multiple descriptions of a given signal; and
reconstructing an estimate of the signal by processing the received multiple descriptions using at least one matrix having a dimension which is selected based at least in part on a comparison of a dimensionality of the signal and a designated number of transmission resources that were utilized to transmit the multiple descriptions such that the selected dimension of the matrix has a first value when the designated number of transmission resources exceeds the dimensionality of the signal and a second value different than the first vale when the designated number of transmission resources is less than the dimensionality of the signal;
wherein a number of descriptions received is based at least in part on the selected dimension; and
wherein the signal comprises at least one of video information, image information, audio information and voice information.

28. A non-transitory computer-readable storage medium having embodied therein executable program code that when executed by a processor of a processing device causes the device to perform the steps of the method of claim 27.

* * * * *